(12) United States Patent
Manavoglu et al.

(10) Patent No.: US 8,108,390 B2
(45) Date of Patent: Jan. 31, 2012

(54) SYSTEM FOR TARGETING DATA TO SITES REFERENCED ON A PAGE

(75) Inventors: Eren Manavoglu, Santa Clara, CA (US); Alexandrin Popescul, Mountain View, CA (US); Byron Dom, Los Gatos, CA (US); Cliff Brunk, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 125 days.

(21) Appl. No.: 11/644,176

(22) Filed: Dec. 21, 2006

(65) Prior Publication Data

US 2008/0154858 A1 Jun. 26, 2008

(51) Int. Cl.
  *G06F 17/30* (2006.01)
(52) U.S. Cl. ...................... 707/736; 705/14.4
(58) Field of Classification Search ............ 707/100, 707/736; 705/14.4
  See application file for complete search history.

(56) References Cited

U.S. PATENT DOCUMENTS

| | | | |
|---|---|---|---|
| 5,583,763 A | 12/1996 | Atcheson et al. |
| 5,991,735 A | 11/1999 | Gerace |
| 6,006,221 A | 12/1999 | Liddy et al. |
| 6,009,409 A | 12/1999 | Adler et al. |
| 6,026,368 A | 2/2000 | Brown et al. |
| 6,076,088 A | 6/2000 | Paik et al. |
| 6,102,969 A | 8/2000 | Christianson et al. |
| 6,269,361 B1 | 7/2001 | Davis et al. |
| 6,324,519 B1 | 11/2001 | Eldering |
| 6,363,373 B1 | 3/2002 | Steinkraus |
| 6,377,935 B1 | 4/2002 | Deaton et al. |
| 6,401,075 B1 | 6/2002 | Mason et al. |
| 6,516,312 B1 | 2/2003 | Kraft et al. |
| 6,539,348 B1 | 3/2003 | Bond et al. |
| 6,584,464 B1 | 6/2003 | Warthen |
| 6,675,159 B1 | 1/2004 | Lin et al. |
| 6,714,929 B1 | 3/2004 | Micaelian et al. |
| 6,714,975 B1 | 3/2004 | Aggarwal et al. |
| 6,757,675 B2 | 6/2004 | Aiken et al. |

(Continued)

FOREIGN PATENT DOCUMENTS

JP  2001-142972 A  5/2001

(Continued)

OTHER PUBLICATIONS

Stanford Graduate School of Business, "The High Price of Internet Keyword Auctions", at http://www.gsb.stanford.edu/news/research/econ_ostrovsky_internetauction.shtml (last visited Jun. 29, 2007).

(Continued)

*Primary Examiner* — James Trujillo
*Assistant Examiner* — Amresh Singh
(74) *Attorney, Agent, or Firm* — Brinks Hofer Gilson & Lione (57) ABSTRACT

A system is described for targeting data to a site referenced on a page based on a condition. The system may include a processor, a memory, and an interface. The memory may be operatively connected to the processor and the interface and may store a data, a site, a condition, and a page containing content. The interface may be operatively connected to the memory and the processor and may communicate the page to a user. The processor may identify the data, site, condition, and page containing content. The processor may add the data to the page if the content of the page satisfies the condition.

18 Claims, 7 Drawing Sheets

U.S. PATENT DOCUMENTS

| | | | |
|---|---|---|---|
| 6,772,150 | B1 | 8/2004 | Whitman et al. |
| 6,826,572 | B2 | 11/2004 | Colace et al. |
| 6,907,566 | B1 | 6/2005 | McElfresh et al. |
| 7,031,932 | B1 | 4/2006 | Lipsky et al. |
| 7,043,483 | B2 | 5/2006 | Colace et al. |
| 7,051,023 | B2 | 5/2006 | Kapur et al. |
| 7,076,463 | B1 | 7/2006 | Boies et al. |
| 7,136,853 | B1 | 11/2006 | Kohda et al. |
| 7,225,182 | B2 | 5/2007 | Paine et al. |
| 7,231,358 | B2 | 6/2007 | Singh et al. |
| 7,272,597 | B2 | 9/2007 | Chowdhury et al. |
| 7,363,302 | B2 | 4/2008 | Lester |
| 7,523,095 | B2 | 4/2009 | Gates et al. |
| 7,565,630 | B1 | 7/2009 | Kamvar et al. |
| 7,599,938 | B1 | 10/2009 | Harrison, Jr. |
| 7,660,734 | B1 | 2/2010 | Neal et al. |
| 2002/0002525 | A1 | 1/2002 | Arai et al. |
| 2002/0169759 | A1 | 11/2002 | Kraft et al. |
| 2003/0046161 | A1 | 3/2003 | Kamangar et al. |
| 2003/0101126 | A1 | 5/2003 | Cheung et al. |
| 2003/0144925 | A1 | 7/2003 | McGee |
| 2003/0149938 | A1 | 8/2003 | McElfresh et al. |
| 2004/0093327 | A1 | 5/2004 | Anderson et al. |
| 2004/0133471 | A1 | 7/2004 | Pisaria-Henderson et al. |
| 2004/0186776 | A1 | 9/2004 | Llach |
| 2004/0267725 | A1* | 12/2004 | Harik .................................. 707/3 |
| 2005/0010477 | A1 | 1/2005 | Sullivan et al. |
| 2005/0021387 | A1 | 1/2005 | Gottfurcht |
| 2005/0076130 | A1 | 4/2005 | Anand et al. |
| 2005/0154746 | A1 | 7/2005 | Liu et al. |
| 2005/0180549 | A1* | 8/2005 | Chiu et al. ................. 379/88.16 |
| 2005/0189414 | A1 | 9/2005 | Fano et al. |
| 2006/0069614 | A1 | 3/2006 | Agarwal et al. |
| 2006/0117002 | A1 | 6/2006 | Swen |
| 2006/0242017 | A1 | 10/2006 | Libes et al. |
| 2007/0027765 | A1 | 2/2007 | Collins et al. |
| 2007/0033531 | A1* | 2/2007 | Marsh ........................... 715/738 |
| 2007/0060129 | A1 | 3/2007 | Ramer et al. |
| 2007/0078880 | A1 | 4/2007 | Eiron et al. |
| 2007/0100650 | A1 | 5/2007 | Ramer et al. |
| 2007/0118392 | A1 | 5/2007 | Zinn et al. |
| 2007/0233730 | A1 | 10/2007 | Johnston |
| 2007/0250468 | A1 | 10/2007 | Pieper |
| 2007/0266016 | A1 | 11/2007 | Holmens et al. |
| 2007/0271255 | A1 | 11/2007 | Pappo |
| 2007/0282811 | A1 | 12/2007 | Musgrove |
| 2008/0040329 | A1 | 2/2008 | Cussen et al. |
| 2008/0065463 | A1 | 3/2008 | Rosenberg et al. |
| 2008/0104061 | A1 | 5/2008 | Rezaei |
| 2008/0114607 | A1 | 5/2008 | Amer-Yahia et al. |
| 2008/0114672 | A1 | 5/2008 | Yahia et al. |
| 2008/0126191 | A1 | 5/2008 | Schiavi |
| 2008/0177994 | A1 | 7/2008 | Mayer |
| 2008/0215564 | A1 | 9/2008 | Bratseth |
| 2008/0270228 | A1 | 10/2008 | Dasdan |
| 2008/0313164 | A1 | 12/2008 | Lee et al. |

FOREIGN PATENT DOCUMENTS

| | | |
|---|---|---|
| JP | 2002-083173 A | 3/2002 |
| KR | 2001-0094780 A | 11/2001 |
| KR | 10-2003-0066064 | 8/2003 |
| KR | 10-2005-0067239 A | 6/2005 |
| KR | 10-2006-0011336 | 2/2006 |
| KR | 10-2006-026770 A | 3/2006 |
| WO | WO 01/06403 A2 | 7/2000 |

OTHER PUBLICATIONS

Gagan Aggarwal et al. *Truthful Auctions for Pricing Search Keywords*, Proceedings of the 7th ACM conference on Electronic commerce, p. 1-7, Jun. 11-15, 2006, Ann Arbor, Michigan, USA, at http://theory.stanford.edu/~gagan/papers/keyword_auctions_EC06.pdf (last visited Jun. 29, 2007).

Juan Feng et al. 2006. *Implementing Sponsored Search in Web Search Engines: Computational Evaluation of Alternative Mechanisms.* INFORMS Journal on Computing, 19 (1), (Jan. 2007) at http://dpennock.com/papers/feng-joc-2005-sponsored-search.pdf (last visited Jun. 29, 2007).

H. R. Varian. *Position auctions*. International Journal of Industrial Organization, forthcoming. at http://www.ischool.berkeley.edu/~hal/Papers/2006/position.pdf (last visited Jun. 29, 2007).

B. Edelman et al. *Internet advertising and the generalized second price auction: Selling billions of dollars worth of keywords*. NBER working paper 11765, Nov. 2005. at http://rwj.berkeley.edu/schwarz/publications/gsp051003.pdf (last visited Jun. 29, 2007).

Brendan Kitts et al. *A Trading Agent and Simulator for Keyword Auctions*, AAMAS, pp. 228-235, Third International Joint Conference on Autonomous Agents and Multiagent Systems—vol. 1 (AAMAS'04), 2004.

Zhou, Y. et al. Vindictive bidding in keyword auctions. In Second Workshop on Sponsored Search Auctions (2006), ACM Electronic Commerce. at http://www.cse.wustl.edu/~yzhou/yunhongzhou/documents/06-ssa-vindictive.pdf (last visited Jun. 29, 2007).

PCT Serial No. PCT/US08/059062, Filed Apr. 1, 2008, Notification of Transmittal of the International Search Report and the Written Opinion of the International Searching Authority, or the Declaration Dated Aug. 18, 2008, pgs. 1.

PCT Serial No. PCT/US08/059041, Filed Apr. 1, 2008, Notification of Transmittal of the International Search Report and the Written Opinion of the International Searching Authority, or the Declaration Dated Sep. 8, 2008, pgs. 1.

C. Li, K. Chen-Chang, I. Ilyas, S. Song, *RankSQL: Query Algebra and Optimization for Relational Top-k Queries*, SIGMOD Conference 2005.

N. Bruno, S. Chaudhuri, L. Gravano, *Top-K Selection Queries Over Relational Databases: Mapping Strategies and Performance Evaluation*, ACM Transactions on Database Systems (TODS), 28(2), 2002.

Y. Diao, P. Fischer, M. Franklin, R. To, *YFilter: Efficient and Scalable Filtering of XML Documents*, ICDE Conference 2002.

F. Fabret, H. Jacobsen, F. Llirbat, J. Pereira, *Filtering Algorithms and Implementation for Very Fast Publich/Subscribe Systems*, SIGMOD Conference 2001.

R. Fagin, A. Lotem, M. Naor, *Optimal aggregation algorithms for middleware*, PODS Conference 2001.

V. Hristidis, N. Koudas, Y. Papakonstantinou, *PREFER: A system for the Efficient Execution of Multiparametric Ranked Queries*, SIGMOD Conference 2001.

F. Chu, J.Y. Halpern, P. Seshadri, *Least Expected Cost Query Optimization: An Exercise in Utility*, PODS Conference 1999.

D. Donjerkovic, R. Ramakrishnan, *Probabilistic Optimization of Top N Queries*, VLDGB Conference 1999.

H.V. Jagadish, N. Koudas, M. Muthukrishnan, V. Poosala, K. Sevcik, T. Suel, *Optimal Histograms with Quality Guarantees*, VLDB Conference 1998.

M.J. Carey, D. Kossmann, *On Saying "Enough Already?" in SQL*, SIDMOD Conference 1997.

R. Fagin, *Combining fuzzy information from multiple systems*, PODS Conference 1996.

D. Pisinger, *Algorithms for Knapsack Problems*, Ph.D Thesis, 1995.

E. Zemel, *An O(n) Algorithm for the Linear Multiple Choice Knapsack Problem and Related Problems*, Information Processing Letters, 1984.

J.L. Bentley, *Multidimensional Binary Search Trees Used for Associative Searching*, Commun. ACM 18(9): 509-517 (1975).

Google Scholar Search dated Mar. 11, 2011; for U.S. Appl. No. 11/750,512, 3 pages International Preliminary Report on Patentability dated Oct. 13, 2009 for corresponding International Application No. PCT/US2008/059041, 4 pages.

International Preliminary Report on Patentability dated Oct. 13, 2009 for corresponding International Application No. PCT/US2008/059062, 5 pages.

International Preliminary Report on Patentability dated Oct. 27, 2009 for corresponding International Application No. PCT/US2008/059865, 5 pages.

International Search Report and Written Opinion of the International Searching Authority dated Aug. 27, 2008 for corresponding International Application No. PCT/US2008/059865, 6 pages.

* cited by examiner

SYSTEM FOR TARGETING DATA TO SITES REFERENCED ON A PAGE

TECHNICAL FIELD

The present description relates generally to a system and method, generally referred to as a system, for targeting data to sites referenced on a page, and more particularly, but not exclusively, to targeting advertisements to sites referenced in a list of search results.

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) may enable a page to be configured to contain a location for inclusion of an advertisement. An advertisement may be selected for display each time the page is requested, for example, by a browser or server application.

Some online advertising engines, such as YAHOO! SPONSORED SEARCH may allow an advertiser to place a bid on a keyword or query. If a web surfer searches for the search term the advertiser bid on, the advertiser's advertisement may be displayed to the web surfer. This may be a viable mechanism for concept-based advertising; however it may only allow an advertiser to target web surfers based on a keyword or a query. This may require an advertiser to predict keywords or queries that may be searched by web surfers the advertiser may wish to target.

SUMMARY

A system is disclosed for targeting data to a site referenced on a page based on a condition. The system may include a processor, a memory, and an interface. The memory may be operatively connected to the processor and the interface and may store a data, a site, a condition, and a page containing content. The interface may be operatively connected to the memory and the processor and may communicate the page to a user. The processor may identify the data, site, condition, and page containing content. The processor may add the data to the page if the content of the page satisfies the condition.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

Non-limiting and non-exhaustive descriptions are provided with reference to the following drawings. In the drawings, like reference numerals may refer to like parts throughout the various figures unless otherwise specified.

FIG. 6 is a screenshot of a page displaying advertisements.

DETAILED DESCRIPTION

A system and method, generally referred to as a system, relate to targeting data to a site referenced on a page, and more particularly, but not exclusively, to targeting an advertisement to one or more web sites or pages that are referenced in a list of search results.

The principles described herein may be embodied in many different forms. An advertiser's ads may be more efficient when the advertiser has more control over when the advertisements may be displayed to web surfers. The system may allow a revenue generator to target their online advertisements to specific sites that may be referenced to any set of search results, regardless of the query that was performed. The system may allow the revenue generator to specify a condition associated with the site and the system may only display the advertisement if the condition associated with the site is met. The system may allow a revenue generator to bid on a specific site or page, an entire domain, a sub-domain or any part of domain, a group of sites that may be based on characteristics that may be desirable to revenue generators, and on a category, which may include any sites that fall into the category.

Figure 1:
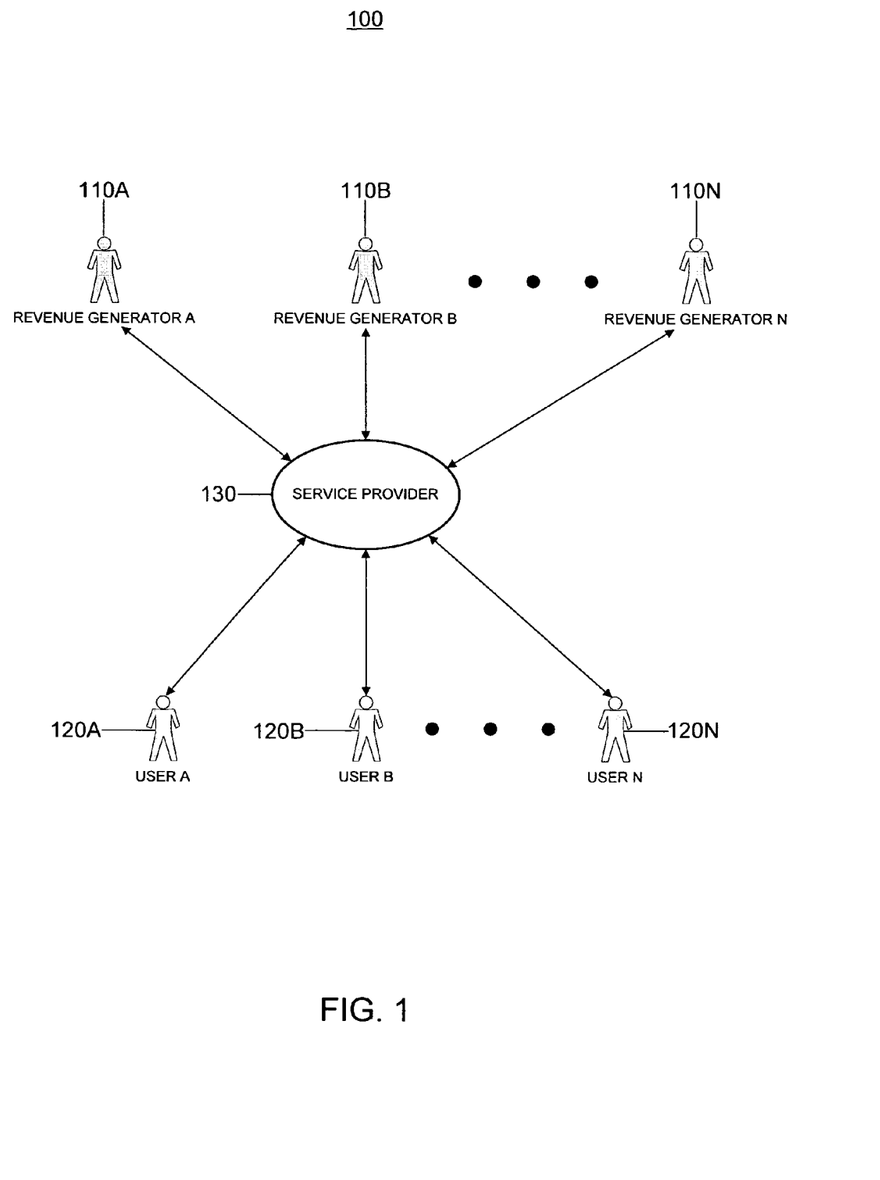
FIG. 1 is a block diagram of a general overview of a system for targeting data to sites referenced on a page.

FIG. 1 provides a general overview of a system 100 for targeting data to a site referenced on a page. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as advertisers, a service provider 130, such as a portal, and one or more users 120A-N, such as web surfers. The revenue generators 110A-N may pay the service provider 130 to display advertisements, such as on-line advertisements on a network such as the Internet. The payments may be based on various factors, such as the number of times an advertisement is displayed to the users 120A-N and/or the number of times one of the users 120A-N clicks through the advertisement to the revenue generator's web site. The users 120A-N may be consumers of goods or services who are searching for a business such as the business of one of the revenue generators 110A-N.

In the system 100, the revenue generators 110A-N may interact with the service provider 130, such as via a web application. The revenue generators 110A-N may send information, such as billing, website and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application. The users 120A-N may also interact individually with the service provider 130, such as via a web application. The users 120A-N may interact with the service provider 130 via a web based application or a standalone application. The service provider 130 may communicate data to the revenue generators 110A-N and the users 120A-N over a network. The following examples may refer to a revenue generator A 110A as an online advertiser; however the system 100 may apply to any revenue generators 110A-N who may target data to one or more sites referenced on a page.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is an online advertiser, the revenue generator A 110A may provide initial information necessary to open an account with the service provider 130.

A revenue generator A 110A who is an online advertiser may maintain several accounts with the service provider 130. For each account the revenue generator A 110A may maintain several listings. A listing may include one or more sites, group of sites, a category, or some combination of the previous three, an advertisement, a URL, a bid amount and a condition. A listing may represent an association between one or more sites, group of sites or category identified by the revenue generator A 110A, a condition relating to the one or more sites, group of sites or category identified by the revenue generator A 110A, and an advertisement of the revenue generator A 110A.

The advertisement may represent the data the revenue generator A 110A wishes to be displayed to a user A 120A. The URL may represent the link the revenue generator A 110A wishes a user A 120A to be directed to upon clicking on the advertisement of the revenue generator A 110A, such as the home page of the revenue generator A 110A. The bid amount may represent a maximum amount the revenue generator A 110A may be willing to pay each time a user A 120A may click on the advertisement of the revenue generator A 110A or each time the advertisement of the revenue generator A 110A may be shown to a user A 120A.

The sites may represent one or more websites that the revenue generator A 110A wishes to associate their advertisement with. When one of the sites selected by the revenue generator A 110A appears on a page, such as in a search results list, the advertisement of the revenue generator A 110A may also be displayed on the page. A site may be a web site. A site may be referenced on a page when the page contains a link that may forward a user A 120A to the site, or if the page contains a text representation of the URL the site.

For example, if a revenue generator A 110A desires to target readers of the NEW YORK TIMES, the revenue generator may bid on the NEW YORK TIMES site, such as "www.nytimes.com". The advertisement of the revenue generator A 110A may be displayed when the NEW YORK TIMES site is referenced on the page, such as when a user A 120A conducts a search and the NEW YORK TIMES site is referenced in the search results. The search keyword or query used by the user A 120A used to generate the search results is irrelevant. No matter which search keyword or query is used by the user A 120A, if the NEW YORK TIMES site is referenced in the search results then the advertisement of the revenue generator A 110A may be displayed. Furthermore, the system 100 does not require that the NEW YORK TIMES site or the owner of the NEW YORK TIMES site participate in the system 100. If a revenue generator A 110A bids on a site and the site is referenced on a search results page, the advertisement of the revenue generator A 110A may be displayed, regardless of whether the site participates in the system 100.

The condition may be a condition that needs to be met before the advertisement may be displayed by the service provider 130 to one of the users 120A-N. The default condition may be that the advertisement may only be displayed when the site associated with the advertisement is referenced on the page or set of related pages. There may also be more specific conditions that may need to be met for the advertisement to be displayed. For example, in the case of a page or set of related pages that contain a list of search results, the condition may specify that the site associated with the advertisement must be referenced in the one of the first twenty search results. If the site is not referenced in one of the first twenty search results then the advertisement may not be displayed.

If the search results are spread across multiple search results pages, the condition may be referenced in regard to the set of search results as a whole as opposed to just the search results on one page, and the condition may be met by one or more of the multiple search results pages. For example, if a condition specifies that the site must be referenced in one of the first twenty search results, and the site is referenced in one of the first twenty search results, then the condition may be met for any pages that contain any of the first twenty search results, even if the page does not contain the actual site. Alternatively or in addition, a revenue generator A 110A may specify that the condition only be met by the page containing the actual site. Furthermore, if a condition specifies the first twenty search results and a user A 120A is referred to a page by a link within the first twenty search results the condition may also be met by the page the user A 120A is referred to.

In another example the condition may be that the site associated with the advertisement not be referenced on the page. In this case, the advertisement may only be displayed if the site is not referenced anywhere on the page. Thus, there may be some instances where the site associated with the advertisement may be referenced on the page but the advertisement may not be displayed.

If the listing contains more than one site, such as site1 and site2, the condition may be a complex condition referencing each of the sites. For example, the condition may specify that site1 be referenced on the page in order to display the advertisement, but site2 should not be referenced on the page in order to display the advertisement. In this case, the advertisement may only be displayed if site1 is referenced on the page and site2 is not referenced on the page.

The site may be a specific page, a group of pages, a sub-domain, an entire domain or a category. The system 100 may be configured to only allow revenue generators 110A-N to bid on one of the site forms. For example, if the system 100 is configured to only allow bidding on a domain, the revenue generators 110A-N may only have the capability to bid on domains, not on specific pages, sub-domains, groups of sites or categories. The system 100 may allow revenue generators 110A-N to bid on any combination of the site forms. In this case, if a revenue generator A 110A bids on a site form that includes more than one page, their same bid may be propagated across all of the pages within the site form. For example, if a revenue generator A 110A bids on a domain or sub-domain, then the same bid may be propagated across all pages within the domain or sub-domain. Alternatively or in addition, the bid may be divided into as many equal parts as there are pages within the domain or sub-domain and each page within the domain and sub-domain may be given a divided equal bid.

Instead of identifying a single site or page, the revenue generator A 110A may select a group of related sites represented by a textual identifier describing the group of sites. Sites may be grouped based on several factors, including demographics, geographic location, industry sectors, competitors, categories, or any grouping of sites that may be desirable for a revenue generator targeting advertisements. In the case of demographics, the sites may be grouped based on the demographics of users who historically visit the site most often. For example, the system 100 may have a grouping of the top fifty sites visited most often by males ages 18-39. If a revenue generator A 110A bids on this group, then their advertisement may be displayed anytime any of the sites in the group are referenced on a page. The system 100 may group sites together based on any demographics of users 120A-N that may be desirable to a revenue generator A 110A targeting advertisements. The revenue generator A 110A may specify the number of sites they wish to target or may specify that all sites visited by the demographic be targeted. This may enable a revenue generator A 110A to efficiently target sites that are popular with a specific demographic. Alternatively, or in addition, the sites within the group may continuously fluctuate as the sites that are most popular with the specific demographic group fluctuate.

In the case of sites grouped together based on a geographic location, the revenue generator A 110A may select a geographic area or specify a physical location and a range from the physical location. The system 100 may present the revenue generator A 110A with a group of sites that are relevant to the geographic area specified by the revenue generator A 110A. The sites in the group of sites may refer to entities that may physically be located within the geographic region or the sites may be relevant to the geographic region based on some other factor.

For example, the revenue generator A 110A may enter a location of Chicago, Ill. In this instance, the system 100 may associate the advertisement of the revenue generator A 110A with the geographic location of Chicago, Ill. The advertisement of the revenue generator A 110A may be displayed to one of the users 120A-N when a site that is relevant to Chicago, Ill. is referenced on a page, such as a search result page or a map page. This may enable a revenue generator A 110A to efficiently target their advertisement to sites that are relevant to a geographic area and therefore to the users 120A-N who may be interested in the geographic area.

Alternatively or in addition, a condition may be based on a site and a geographic location of the user. In this case the revenue generator A 110A may specify a complex condition relating to both a site and to the geographic location of the users 120A-N. The condition may only be satisfied when the condition relating to the site is met and the condition relating to the geographic location of the users 120A-N is met. For example, the condition relating to the site may be met if the site is referenced on the page and the condition relating to the geographic location may be met if the users 120A-N are located within a geographic area specified by the revenue generator A 110A. The location of the users 120A-N may be identified by the IP address of the users 120A-N or any other method of identifying the location of users 120A-N accessing the system 100.

In the case of sites grouped together based on industry sectors, the revenue generator A 110A may specify a industry sector grouping of sites to target their advertisement to. The sites included in an industry sector grouping may include the sites of any entities involved in the industry sector, the sites of trade journals or publications relating to the industry sector, the sites of professional organizations related to the industry sector, or any other associated sites relating to the industry sector. For example, the revenue generator A 110A may wish to target their advertisement to all sites referring to the automotive industry sector. In this case, the service provider 130 may display the advertisement of the revenue generator A 110A anytime a site relevant to the automotive industry is referenced in a page, such as a search results page. This may enable a revenue generator A 110A to target their advertisement to specific market sectors and the users 120A-N who are likely to have an association with the industry sector.

In the case of grouping sites based on competitors, a revenue generator A 110A may target their advertisements to references to their competitors' sites or the competitors' of any entity the revenue generator A 110A selects. A revenue generator A 110A may enter the name of an entity and the service provider 130 may display the advertisement of the revenue generator A 110A anytime a site of a competitor to the entity is referenced on a page, such as a search results page. For example, if the revenue generator A 110A selects the ALTRIA GROUP, then the advertisement of the revenue generator A 110A may be displayed to users 120A-N when the sites of competitors to THE ALTRIA GROUP, such as BRITISH AMERICAN TOBACCO, NESTLE, REYNOLDS AMERICAN, etc, are referenced on a page, such as a search results page. This may provide revenue generators 110A-N with an efficient way to target their advertisements to sites of their competitors.

In the case of sites grouped based on a category or topic, the revenue generator A 110A may identify a category, and the top fifty most visited sites relating to the category may form the group of sites the advertisement of the revenue generator A 110A may be targeted to. The sites may also be grouped based on historical data indicating the top fifty sites most often visited when one of the users 120A-N performs a search with the category in the search query. The revenue generator A 110A may also specify the number of sites to add to the group or the revenue generator A 110A may specify that all sites relating to the category be added to the group. The categorization may be done based on a flat set of categories, or into a taxonomy of topics. This type of grouping may provide a revenue generator A 110A with a way to efficiently target sites relating to a particular category.

Alternatively, or in addition, the method of associating an advertisement to a category may be implemented with a dynamic methodology. The revenue generator A 110A may identify a category of sites to associate their advertisement with. The service provider server 130 may then analyze a page, such as a search result page, to determine if any of the sites referenced on the page are relevant to the category. The relevance to the category may be based on the content of the site referenced on the page itself. This may be performed by implementing a machine learning document categorization model.

A machine learning document categorization model may require several initial steps before such a model may be implemented. The service provider 130 may need to identify a set of training data comprising sites or pages with a known category. The service provider may need to identify a machine learning algorithm to use. Any machine learning algorithm capable of categorizing documents may be suitable, including decision trees, such as ID3, or C4.5 decision trees, artificial neural networks, pattern recognition with K-nearest neighbor classifiers, or probability based classifiers, such as a Bayes classifier or a naïve Bayes classifier. The service provider 130 may train the selected machine learning algorithm with the training data, which may result in the generation of a document categorization model. The service provider 130 may then utilize the document categorization model by applying the model to the content of the pages referenced on a page, such as a search results page.

Occasionally the service provider 130 may identify pages that may be categorized improperly. In this case, the service provider 130 may correct the categorization of the page and may add the correctly categorized page to the training data. The machine learning algorithm may then be retrained with the training data to generate a more accurate document categorization model. The machine learning document categorization modeling implementation may be applied to any of the methods of grouping sites, such as grouping by industry sector, by demographics, etc.

The revenue generator A 110A may also supply a daily budget for each account, which may represent the maximum amount of charges the service provider 130 may charge to each account on a given day. If this budget value is reached on a given day for a given account, or other period of time identified for the budget, the service provider 130 may stop displaying the advertisements for the given account of the advertiser until the next day or until the expiration of some other defined period of time.

Figure 2:
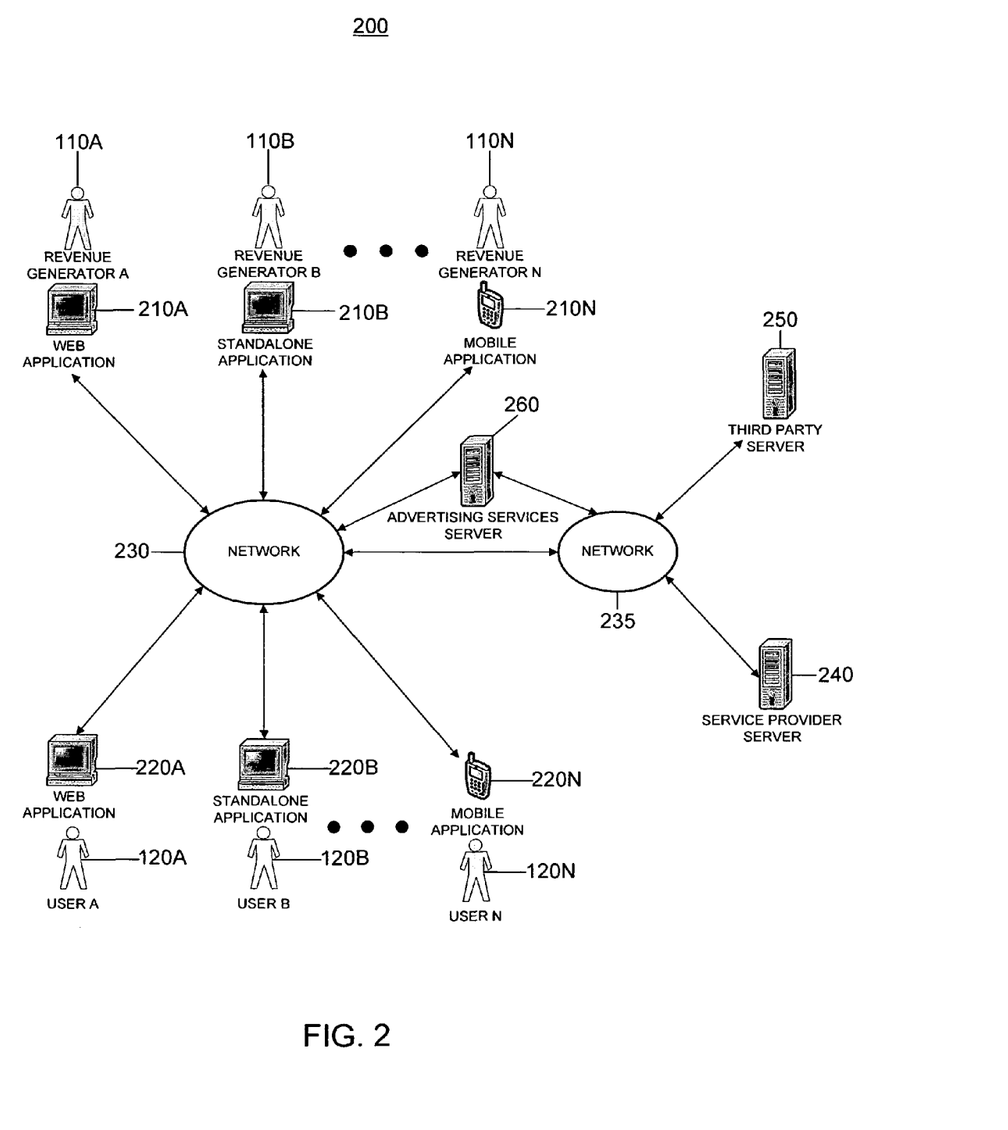
FIG. 2 is block diagram of a simplified view of a network environment implementing a system for targeting data to sites referenced on a page.

FIG. 2 provides a simplified view of a network environment implementing a system 200 for targeting data to sites referenced on a page, such as targeting advertisements to sites referenced on a search results page. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the users 120A-N, or individually as a user client application. The system 200 may also include a network 230, a network 235, the service provider server 240, a third party server 250, and an advertising services server 260.

Some or all of the advertisement services server 260, service provider server 240, and third-party server 250 may be in communication with each other by way of network 235 and may be the system or components described below in FIG. 7. The advertisement services server 260, third-party server 250 and service provider server 240 may each represent multiple linked computing devices. Multiple distinct third party servers, such as the third-party server 250, may be included in the system 200.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may communicate to the revenue generators 110A-N via the networks 230, 235, through the web applications, standalone applications or mobile applications 210A-N. The service provider server 240 may also communicate to the users 120A-N via the networks 230, 235, through the web applications, standalone applications or mobile applications 220A-N.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the revenue generator B 110B or the user B 120B. The user interface may be operatively connected to the memory, the processor, and the display and may be capable of interacting with a user A 120A or a revenue generator A 110A. The communication interface may be operatively connected to the memory, and the processor, and may be capable of communicating through the networks 230, 235 with the service provider server 240, third party server 250 and advertising services server 260. The standalone applications 210B, 220B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data source, such as a database server, a middleware server, and an advertising services server. The service provider server 240 may co-exist on one machine or may be running in a distributed configuration on one or more machines. The service provider server 240 may collectively be referred to as the server. The service provider server 240 may receive requests from the users 120A-N and the revenue generators 110A-N and may serve pages to the users 120A-N and the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The service provider server 240 may receive requests from the users 120A-N and the revenue generators 110A-N and may serve pages to the users 120A-N and the revenue generators 110A-N based on their requests.

The advertising services server 260 may provide a platform for the inclusion of advertisements in pages, such as web pages. The advertisement services server 260 may be used for providing advertisements that are displayed to the users 120A-N.

Figure 7:
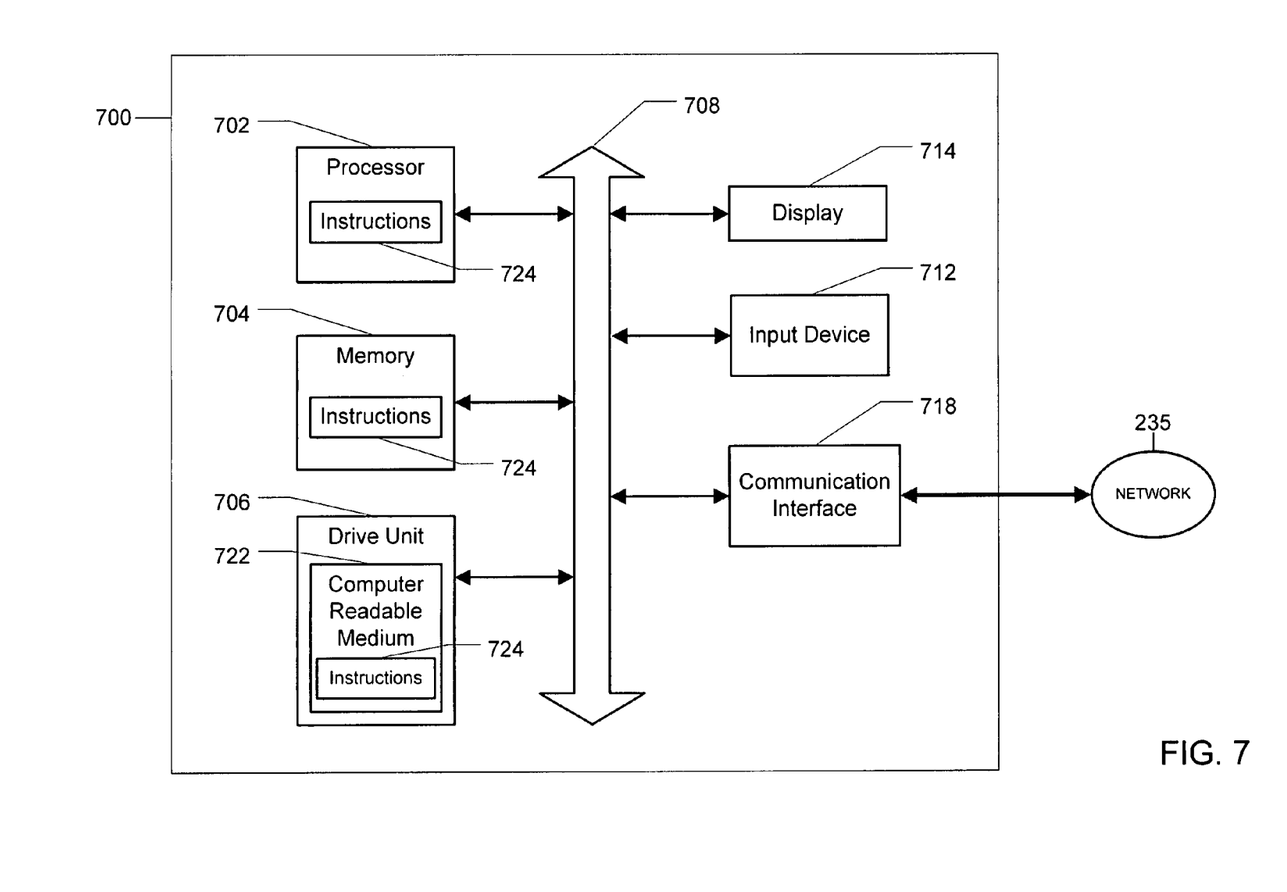
FIG. 7 is an illustration a general computer system that may be used in a system for targeting data to sites referenced on a page.

The service provider server 240, the third party server 250 and the advertising services server 260 may be one or more computing devices of various kinds, such as the computing device in FIG. 7. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120A-N and the revenue generators 110A-N. The advertising services server may provide a platform for the inclusion of advertisements in pages, such as web pages. The advertising services server 260 may also exist independent of the service provider server 240 and the third party server 250. The advertisement services server 260 may be used for providing advertisements that are displayed to users 120A-N on pages, such as web pages.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
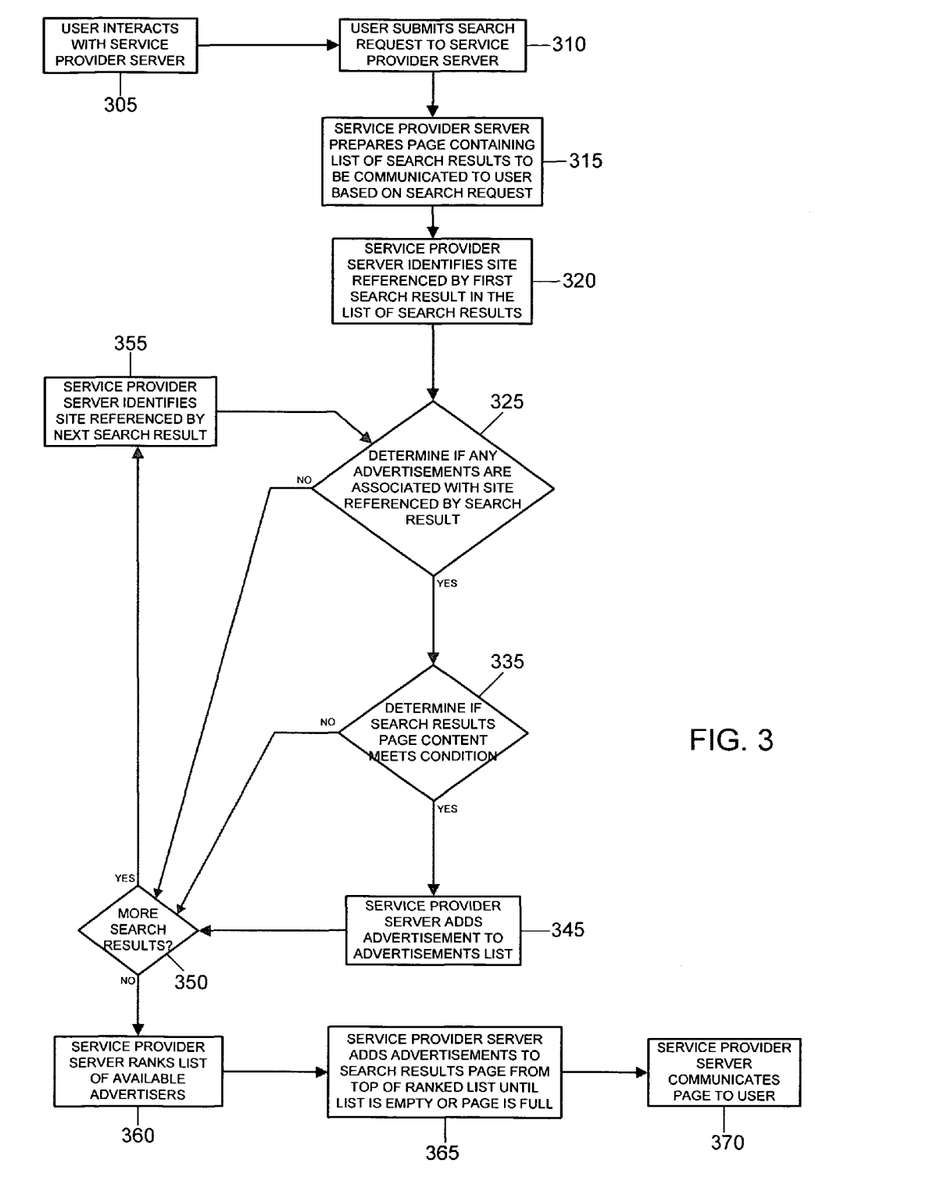
FIG. 3 is a flowchart illustrating the operations of the systems of FIG. 1 and FIG. 2, or other systems for targeting data to sites referenced on a page.

FIG. 3 illustrates operations of the systems of FIG. 1 and FIG. 2, or other systems for targeting data to sites referenced on a page. At block 305 a user, such as the user A 120A may interact with the service provider server 240. At block 310, the user A 120A may use a web application, such as the web application 210A to submit a search request to the service provider server 240. At block 315, the service provider sever 230 may execute the requested search and may prepare a list of search results to be communicated to the user A 120A for display on the computing device used by the user A 120A.

At block 320 the service provider server 240 may identify the site referenced by the first search result in the list of search results, or any search result in the list of search results. Alternatively, or in addition, the service provider server 240 may process all the search results in the list of search results in batch, the service provider server 240 may process the list of search results in a different order than the display order, or the service provider server 240 may process the list of search results in an unordered manner. At block 325, the service provider server 240 may determine whether there are any advertisements associated with the site referenced by the search result. If there are no advertisements associated with the site the system 100 may move to block 350. If there are advertisements associated with the site referenced by the search result the system 100 may move to block 335. At block 335, the service provider server 240 may determine whether the content of the search results page meets the condition specified by the revenue generator A 110A of displaying the advertisement relating to the site, if such a condition exists. If the condition relating site is not met, the system 100 may move to block 350. If the condition relating to the site is met, then the system 100 may move to block 345.

At block 345, the service provider server 240 may add the advertisement to an available advertisement list. The available advertisement list may include any advertisements targeting a site on the page, targeting the keyword or query of the search, or targeting any other feature or characteristic of the page. The service provider server 240 may maintain separate available advertisement lists for the different types of targeting or the service provider server 240 may maintain one list for all available advertisements.

After adding the advertisement to the available advertisements list, the system 100 may move to block 350. At block 350, the service provider server 240 may determine whether there are other search results remaining in the list of search results. If there are other search results remaining in the list of search results the system 100 may move to block 355. At block 355 the service provider server 240 may identify the next search result and the site referenced by the next search result. The system 100 may move back to block 325 and determine whether there are any advertisements associated with the site referenced by the next search result.

If at block 350 the service provider server 240 determines there are no additional search results, the system 100 may move to block 360. At block 360, the service provider server 240 may rank the list of available advertisements. The service provider server 240 may use several factors in ranking the advertisements, such as the amount bid on the advertisement, the click count of the advertisement, which may represent the number of times a web surfer has clicked on the advertisement, the click through rate, which may represent the number of times web surfers clicked on the advertisement in relation to the number of times the advertisement was shown to web surfers, the relevance of the advertisement to the site targeted by the advertisement, the relevance of the site referenced by the advertisement to the site targeted by the advertisement, or any other factor that may be useful in ranking the available advertisements. The relevance of the advertisement to the associated site and the relevance of the site referenced by the advertisement to the site associated with the advertisement may be determined by using the aforementioned machine learning document categorization modeling.

The service provider server 240 may use any combination of the factors to compute the ranking of the available advertisements. Furthermore the service provider server 240 may perform a calculation on one or more of the factors to rank the available advertisements. For example, the service provider server 240 may rank the advertisements based on the amount bid on the advertisements, or the service provider server 240 may rank the advertisements based on a calculation involving the click through rate and the bid amount, such as multiplying the click through rate by the bid amount, or the service provider server 240 may rank the advertisements based on a value outputted by a machine learning document categorization model that may indicate the likelihood that the advertisement is relevant to the content of the site or the service provider server 240 may rank the advertisements based on the output of the machine learning document categorization model in conjunction with one of the other variables, such as multiplying the output by the amount bid. The service provider may order the available advertisements so that the most profitable or relevant advertisement is ranked first and the least profitable or relevant advertisement is ranked last.

After ranking the advertisements the system 100 may move to block 365. At block 365 the service provider server 240 may add the advertisements from the ranked list of available advertisements to allotted space on the search results page. The service provider server 240 may add the advertisements to the page in the order the advertisements appear in the ranked list. There may not be enough space on the search results page for all of the available advertisements. Therefore, some of the advertisements in the ranked list may not be included on the search results page. Alternatively or in addition, there may not be enough advertisements in the ranked list to fill the space allotted for advertisements on the search results page. In this case, the service provider server 240 may leave the allotted space empty or may add other advertisements to the allotted space. Once the service provider server 240 has filled the allotted advertisement space on the search results page, or the once all the advertisers on the ranked list have been added to the page, the system 100 may move to block 370. Alternatively or in addition, the service provider server 240 may not display an advertisement if the value used in ranking the advertisement is below a certain threshold.

At block 370, the service provider server 240 may communicate the search results page, with the advertisements added to the allotted space, to one of the users 120A-N through the networks 230, 235. The search results page may be displayed by one of the web application 220A, standalone application 220B or mobile application 220N.

Figure 4:
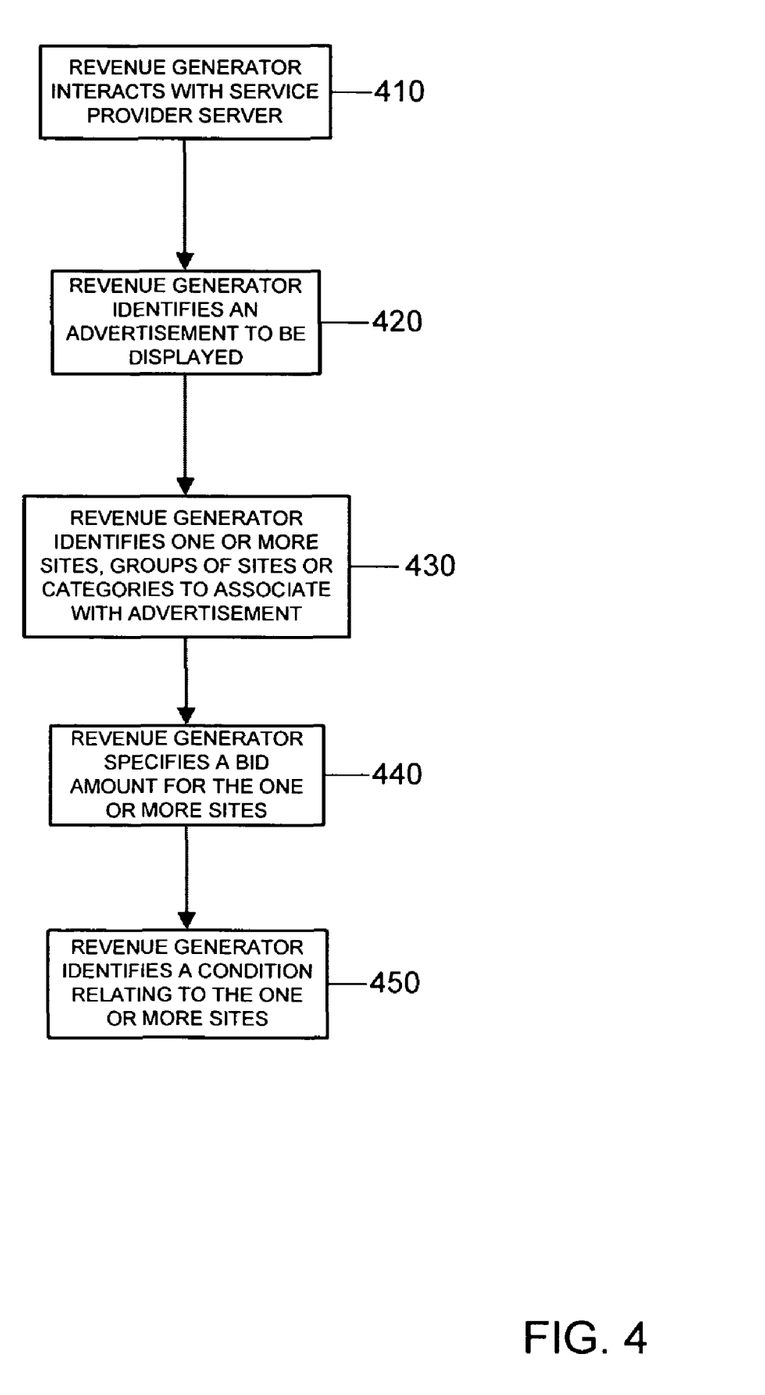
FIG. 4 is a flowchart illustrating steps that may be taken by a revenue generator in the systems of FIG. 1, and FIG. 2, or other systems for targeting data to sites referenced on a page.

FIG. 4 illustrates steps that may be taken by one of the revenue generators 110A-N in the systems of FIG. 1, and FIG. 2, or other systems for targeting data to sites referenced on a page. At block 410 a revenue generator, such as the revenue generator A 110A, may interact with the service provider server 240. The revenue generator A 110A may interact with the system 200 by using a web application 210A, a standalone application 210B or a mobile application 210N. The revenue generator A 110A may interact with the service provider server 240 by accessing a web page served by the service provider server 240. At block 420 the revenue generator A 110A may identify an advertisement to be displayed to users 120A-N. The advertisement may include a graphical or text description and a URL that the revenue generator A 110A may wish to refer the users 120A-N to. Once the revenue generator A 110A identifies an advertisement, the system 100 may move to block 430.

At block 430, the revenue generator A 110A may identify one or more sites, groups of sites or categories to associate with the advertisement identified in block 420. The revenue generator A 110A may identify the sites, groups of sites or categories by utilizing any of the aforementioned methods. The site may be a page, a sub-domain or any identifiable part of a domain.

At block 440 the revenue generator A 110A may specify a condition relating to the one or more sites, group of sites or categories, to be associated with the advertisement. The condition may relate to the one or more sites, group of sites or categories and may refer to the content on the page. The advertisement may not be added to the page by the service provider server unless the condition is met. If more than one site, or a group of sites or a category are targeted by the revenue generator A 110A in block 430, then the condition may require that all sites targeted by the advertisement be referenced on the page or the condition may only require that any one of the sites targeted by the advertisement be referenced on the page.

If the revenue generator A 110A specifies more than one site or a category or group, then the revenue generator A 110A may specify a complex condition that may reference each of the sites identified in block 420 individually. For example, if the revenue generator A 110A identifies site1 and site2 in block 430, the revenue generator may specify a condition that site1 be present in the list of search results, but site2 be not present in the list of search results. In this case the advertisement specified by the revenue generator A 110A in block 420 may only be displayed if both the site1 is present in the list of search results and site2 is not present in the list of search results. If the revenue generator A 110A specifies one or more group of sites or categories, the revenue generator A 110A may reference the group or category as a whole or may reference the individual sites that make up the group or category.

Once the revenue generator A 110A specifies a condition the system 100 may move to block 450. At block 450 the revenue generator A 110A may specify a bid amount for the one or more sites, groups and categories. The bid amount may refer to the amount the revenue generator A 110A may pay the service provider 130 if their advertisement is displayed to one of the users 120A-N or if one of the users 120A-N clicks on their advertisement. The advertisement of the revenue generator A 110A may only be displayed to the users 120A-N if the condition is met. Thus, the revenue generator A 110A may not be charged if the condition is not met, even if the site targeted by the advertisement is referenced on the page.

Figure 5:
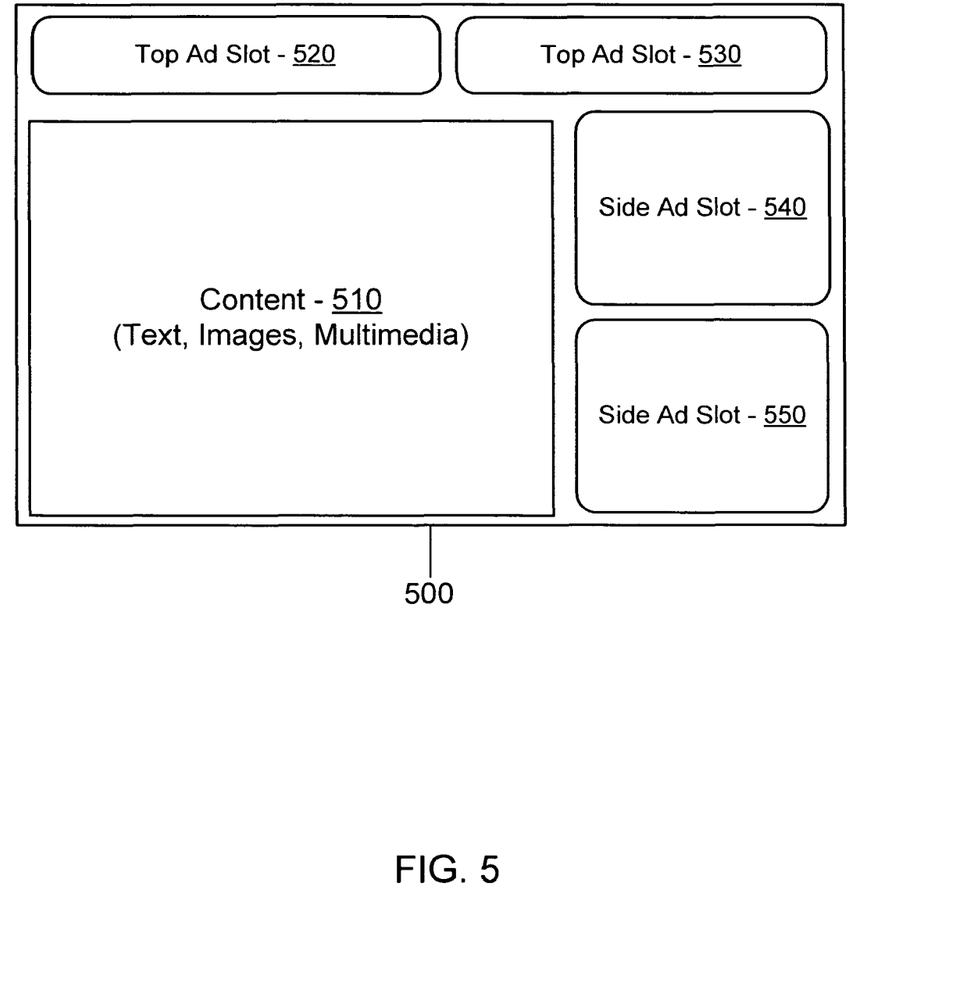
FIG. 5 is an illustration of an exemplary page displaying advertisements.

FIG. 5 illustrates an exemplary page 500 displaying advertisements. The page 500 is displayed by the service provider 130 to the users 120A-N and may be a web page displayed on the Internet. The page 500 includes content 510, such as a list of search results, which is generally the purpose of the page. The page 500 is shown with slots for four advertisements. There are two top ad slots 520, 530 and two side ad slots 540, 550. In the case of a list of search results, the service provider 130 may determine if the content 510 includes a reference to a sites bid on by one of the revenue generators 110A-N or if the content of the pages referenced by the search results matches a category bid on by one of the revenue generators 110A-N. If the content 510 includes a reference to a site bid on by one of the revenue generators 110A-N, such as the revenue generator A 110A, and if any condition specified by the revenue generator A 110A is met, the advertisement of the revenue generator A 110A may be displayed in one of the ad slots 520, 530, 540, 550.

FIG. 6 is screenshot of a page 600 displaying advertisements to the users 120A-N. The page 600 may be displayed to one of the users 120A-N, such as the user A 120A, when the user A 120A searches for the term "plasma." The page 600 may include content 610, top ads 620 and side ads 630. The content 610 may include a search results list 640 based on the search term submitted by the user A 120A, such as "plasma". The search results list 640 may include one or more search results 650. A search result 650 may include a link 652, a URL 654, a description 656 and a rank 658. The top ads 620 and the side ads 630 may represent advertisements that may be associated with sites referenced by a link 652 in the search results list 640. Advertisements may be displayed if the site targeted by the advertisement is referenced anywhere on the page 600, not just in the content 610.

The link 652 may be a clickable link that may reference a site. If one the users 120A-N, such as the user A 120A, clicks on the link 652, the user A 120A may be forwarded to the site referred to by the link 652. The site referred to by the link 652 may be described in the description 656. The description 656 may be used in the machine learning document categorization of the site referred to by the link 652, or the machine learning document categorization may analyze the entire content of the site referenced by the link 652. The URL 654 may represent the URL of the site referred to by the link 652. The rank 658 may represent the order of the search result 650 in the search results list 640.

A condition specified by the revenue generator A 110A for a site and advertisement may stipulate that the site should be one of the first three sites referenced in the search results list 640. If the site was referenced in the search results list 640 by a search result 650 with a rank 658 of 1, 2, or 3, the condition may be met; however, if the site was referenced in the search results list 640 by a search result 650 with a rank 658 of 4 or higher, the condition may not be met. As previously mentioned, the condition that the site be in the top N search results, where N is a number greater than 0, can be met by multiple search results pages if the search results are spread across multiple pages. If the site is located in the top N search results, the condition may be met by any page that contains any of the top N search results, regardless of whether the page contains a reference to the actual site. Alternatively or in addition, a revenue generator A 110A may specify that the condition only be met by the search results page that contains a reference to the site.

FIG. 7 illustrates a general computer system 700, which may represent a service provider server 240, a third party server 250, an advertising services server 260 or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, a third party server 250, an advertising services server 260, the servers may communicate with users 120A-N and the revenue generators 110A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer implemented method for targeting advertisements based on whether a site is referenced on a search results page, comprising:
   receiving, via an interface, an advertisement from an advertiser and a web site identifier of an identified web site not associated with the advertiser;
   storing, in a data store, the advertisement and the web site identifier;
   generating a web page comprising a plurality of search results related to a keyword, each of the plurality of search results comprising a search result content and a search result link, wherein the search result content is displayed on the web page and the search result link comprises a network identifier linking to an associated web site associated with the search result content;
   determining, by a processor, whether the search result link of at least one of the plurality of search results links to the identified web site;
   adding the advertisement to the web page when none of the search result links of the plurality of search results link to the identified web site, and not adding the advertisement to the web page when the search result link of at least one of the plurality of search results links to the identified web site; and
   providing the web page to the user via the interface, wherein the web page comprises the plurality of search results with the advertisement when none of the search result links of the plurality of search results link to the identified web site, and the web page comprises the plurality of search results without the advertisement when the search result link of at least one of the plurality of search results link to the identified web site.

2. The method of claim 1 further comprising:
   receiving a plurality of web site identifiers of a plurality of identified sites via the interface;
   storing the plurality of web site identifiers of the plurality of identified sites in the data store; and
   adding the advertisement to the web page when none of the search result links of the plurality of search results link to any of the plurality of identified sites.

3. The method of claim 2 wherein each of the plurality of identified sites is associated with a common category.

4. The method of claim 2 where in each of the plurality of identified sites appeals to a similar demographic.

5. The method of claim 2 wherein each of the plurality of identified sites describes an entity.

6. The method of claim 5 wherein each entity described by each of the plurality of identified sites is located within a geographic region.

7. The method of claim 5 wherein each entity described by each of the plurality of identified sites are competitors.

8. The method of claim 1 wherein not adding the advertisement to the web page when the search result link of at least one of the plurality of search results links to the identified web site further comprises not adding the advertisement to the web page when the network identifier of the search result link of at least one of the plurality of search results comprises the identifier of the identified web site.

9. A system for targeting advertisements based on whether a site is referenced on a search results page, comprising:
   a memory to store a search results page comprising a plurality of search results, an advertisement from an advertiser, and a web site identifier of an identified web site not associated with the advertiser;
   an interface operatively connected to the memory to communicate a search results page; and
   a processor operatively connected to the memory and the display, wherein the processor receives the web site identifier and the advertisement, identifies the search results page comprising the plurality of search results, the plurality of search results being related to a keyword searched for, and each of the plurality of search results comprising a search result content and a search result link, wherein the search result content is displayed on the search results page and the search result link directs a user to a web site associated with the respective search result content, determines whether the search result link of at least one of the plurality of search results directs the user to the identified web site, adds the advertisement to the search results page when none of the search result links directs the user to the identified web site, does not add the advertisement to the search results page when at least one of the search result links directs the user to the identified web site, and communicates the search results page to the user via the interface, wherein the search results page comprises the plurality of search results with the advertisement when none of the search result links directs the user to identified web site, and wherein the search results page comprises the plurality of search results without the advertisement when at least one of the search results links directs the user to the identified site.

10. The system of claim 9 wherein the search result links of the plurality of search results are not displayed on the search results page.

11. The system of claim 9 wherein the web site identifier of the identified web site comprises at least one uniform resource locator.

12. The system of claim 11 wherein the processor is further operative to not add the advertisement to the search results page when the network identifier of the search result link of at least one of the plurality of search results comprises the at least one uniform resource locator.

13. The system of claim 9, wherein the memory stores a plurality of web site identifiers of a plurality of identified web sites, and wherein the processor adds the advertisement to the search results page when none of the search result links directs the user to any of the plurality of identified web sites, and does not add the advertisement to the search results page when at least one of the search result links directs the user to at least one of the plurality of identified web sites.

14. The system of claim 13 wherein each of the plurality of identified web sites is associated with a common category.

15. The system of claim 13 where in each of the plurality of identified web sites appeals to a similar demographic.

16. The system of claim 13 wherein each of the plurality of identified web sites describes an entity.

17. The system of claim 16 wherein each entity described by each of the plurality of identified web sites is located within a geographic region.

18. The system of claim 16 wherein each entity described by each of the plurality of identified web sites are competitors.

* * * * *